(12) United States Patent
Schaeuble et al.

(10) Patent No.: US 8,782,846 B2
(45) Date of Patent: Jul. 22, 2014

(54) WIPER BLADE AND WIPER DEVICE FOR CLEANING VEHICLE WINDOWS

(75) Inventors: Michael Schaeuble, Vaihingen/Enz (DE); Bruno Egner-Walter, Heilbronn (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 13/433,467

(22) Filed: Mar. 29, 2012

(65) Prior Publication Data
US 2012/0246860 A1 Oct. 4, 2012

(30) Foreign Application Priority Data

Mar. 31, 2011 (DE) .......................... 10 2011 001 688

(51) Int. Cl.
*B60S 1/38* (2006.01)

(52) U.S. Cl.
USPC ................ 15/250.32; 15/250.351; 15/250.43; 15/250.361; 15/250.44; 15/250.201

(58) Field of Classification Search
USPC ........... 15/250.32, 250.351, 250.43, 250.361, 15/250.44, 250.201
See application file for complete search history.

(56) References Cited

U.S. PATENT DOCUMENTS

| | | | |
|---|---|---|---|
| 7,398,577 B2 * | 7/2008 | Genet | 15/250.32 |
| 7,690,074 B2 * | 4/2010 | Ostrowski | 15/250.32 |
| 8,186,002 B2 * | 5/2012 | Kinnaert et al. | 15/250.201 |
| 8,375,504 B2 * | 2/2013 | Kim et al. | 15/250.32 |
| 2006/0059647 A1 * | 3/2006 | Ostrowski | 15/250.32 |
| 2008/0134455 A1 * | 6/2008 | Kinnaert et al. | 15/250.32 |
| 2009/0199357 A1 * | 8/2009 | Thienard | 15/250.32 |
| 2010/0050361 A1 * | 3/2010 | Chang et al. | 15/250.32 |
| 2011/0056041 A1 * | 3/2011 | Wu | 15/250.32 |

FOREIGN PATENT DOCUMENTS

| | | | | |
|---|---|---|---|---|
| EP | 1403156 B1 | 3/2004 | | |
| EP | 1847425 A1 * | 10/2007 | | B60S 1/40 |
| WO | WO 2005039944 A1 * | 5/2005 | | B60S 1/40 |
| WO | WO 2006106006 A1 * | 10/2006 | | B60S 1/40 |
| WO | WO 2010028866 A1 * | 3/2010 | | B60S 1/40 |

* cited by examiner

*Primary Examiner* — Monica Carter
*Assistant Examiner* — Michael Jennings
(74) *Attorney, Agent, or Firm* — Osha Liang LLP

(57) ABSTRACT

A wiper blade for cleaning vehicle windows including a wiper blade body extending in a wiper blade longitudinal axis is disclosed. A wiper blade adapter allows for a mechanical detent connection, of the wiper blade with a wiper arm adapter arranged on a wiper arm. The wiper blade adapter has an elastically arranged detent tongue, which cooperates in a form-fitting manner with the wiper arm adapter to form the detent connection. The wiper arm is U-shaped in cross section and has legs on opposing sides of a base section, which embrace the wiper blade adapter laterally. The connecting or releasing between the wiper blade adapter and the wiper arm adapter takes place at least substantially in a direction perpendicular to the wiper blade longitudinal axis. The detent tongue has a mounting region, which embraces the holding section of the wiper arm adapter.

7 Claims, 3 Drawing Sheets

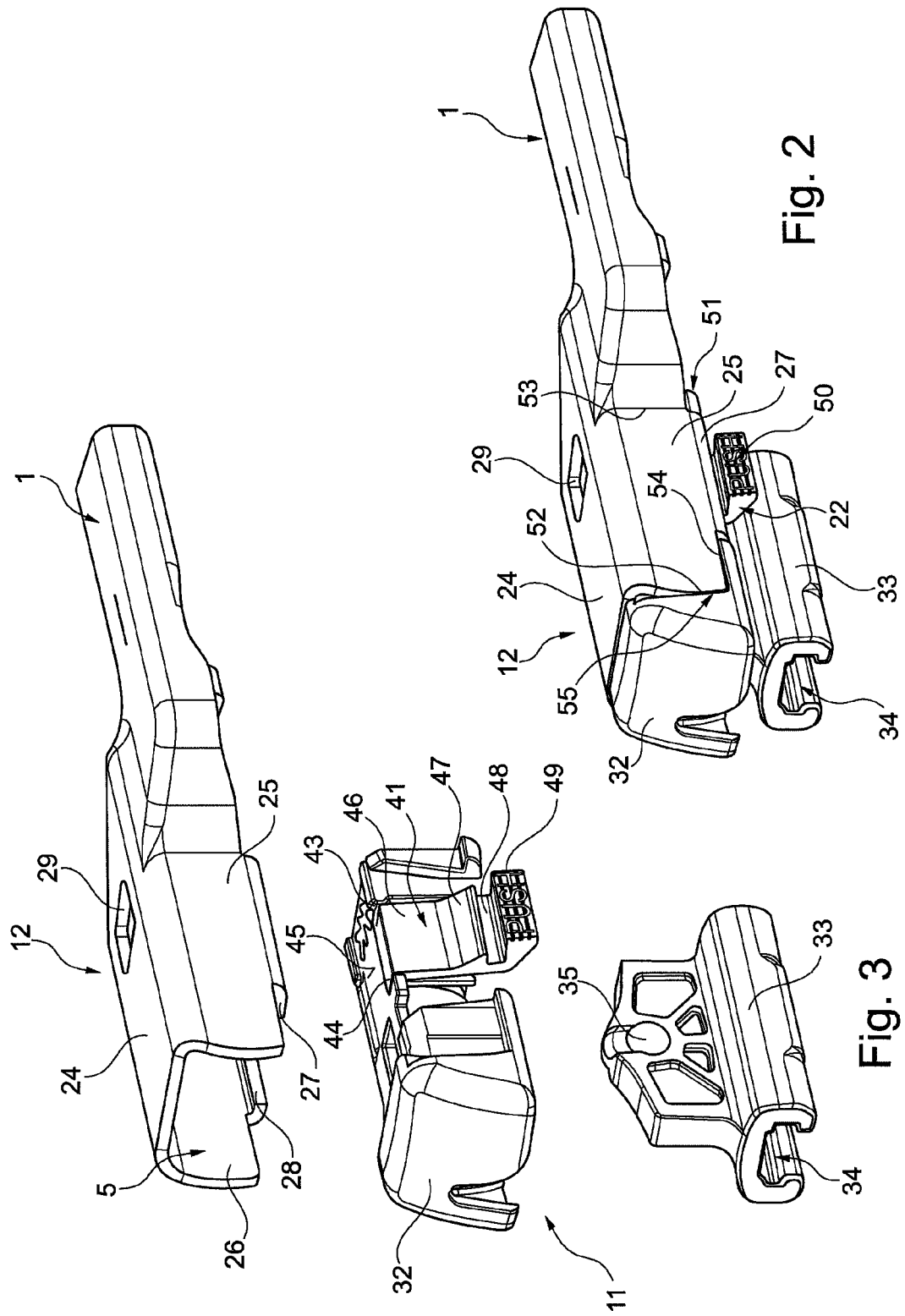

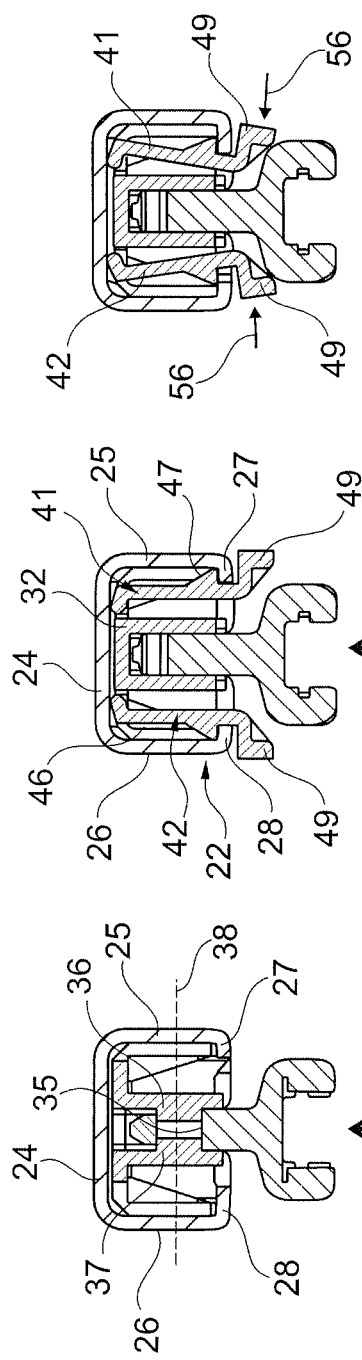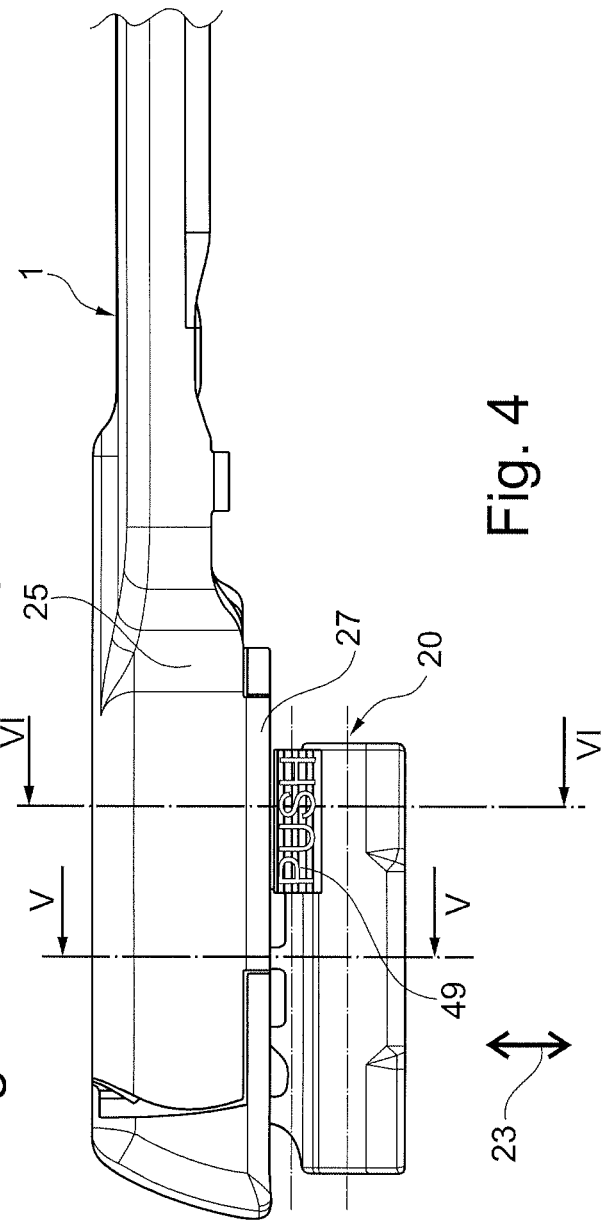

WIPER BLADE AND WIPER DEVICE FOR CLEANING VEHICLE WINDOWS

PRIOR ART

Figure 1:
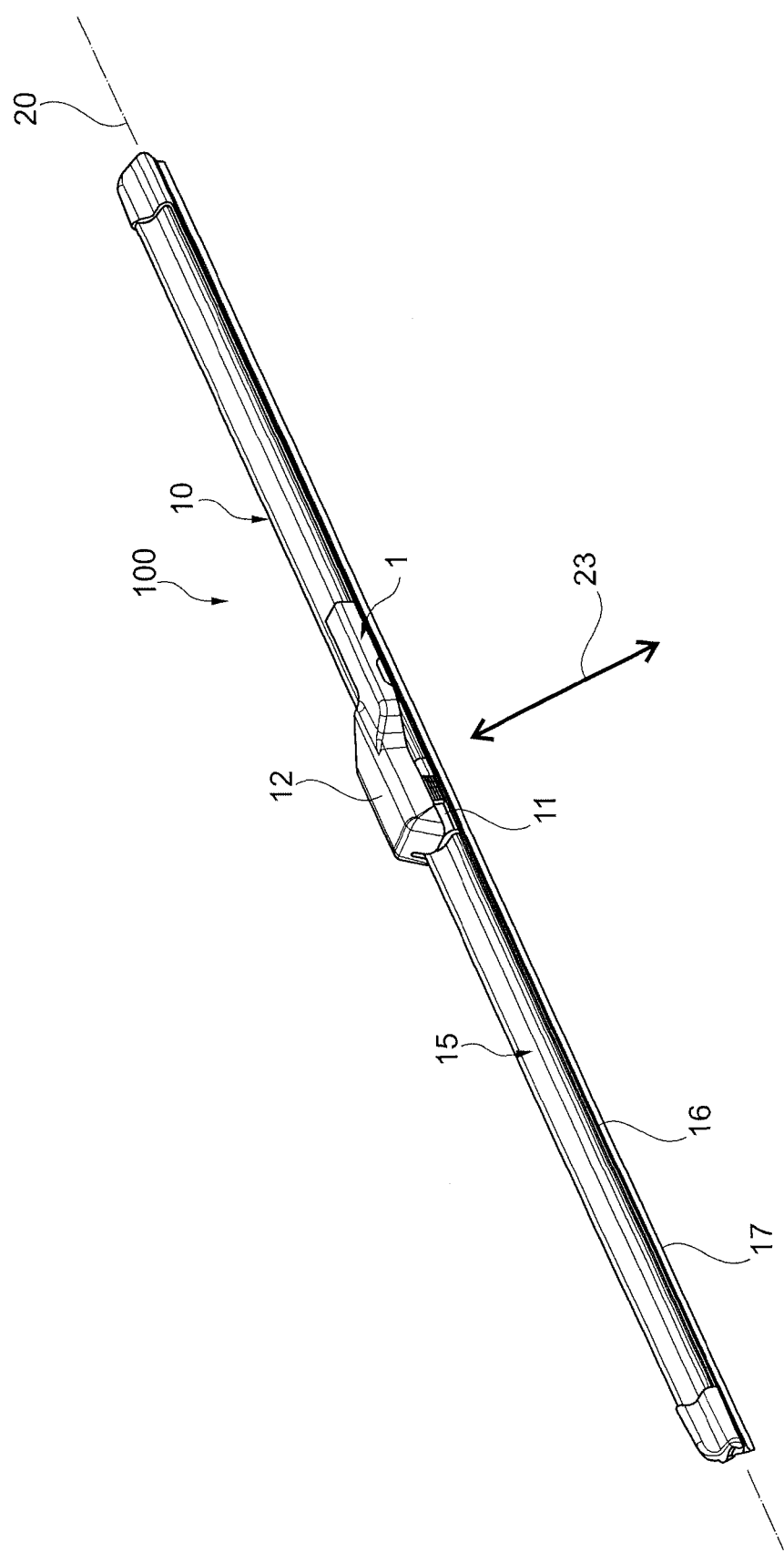

The invention relates to a wiper blade for cleaning vehicle windows, as per the preamble of claim 1. The invention also relates to a wiper device using a wiper blade according to the invention.

A wiper blade for cleaning vehicle windows as per the preamble of claim 1 is known from EP 1 403 156 B1. The known wiper blade has two detent tongues which run in the wiper blade longitudinal direction and which are arranged on opposite sides of the wiper blade adapter. During the mounting on the wiper blade on a wiper arm, said detent tongues engage into correspondingly formed apertures of legs of a wiper arm of substantially U-shaped cross section, and position and lock the wiper blade with respect to the wiper arm in the wiper blade longitudinal direction. Furthermore, the wiper arm has, on the side lying opposite the base of the U-shaped cross section, two inwardly bent holding sections which embrace the wiper blade adapter at a lower side edge and thereby hold the wiper blade adapter in a direction perpendicular to the wiper blade longitudinal direction. The known wiper blade is designed such that it must be mounted on the wiper arm in the wiper blade longitudinal direction. For an operator or driver, it is however often easier from a handling aspect to mount a wiper blade on the wiper arm perpendicularly with respect to the wiper blade longitudinal direction.

DISCLOSURE OF THE INVENTION

It is an object of the invention to further develop a wiper blade for cleaning vehicle windows as per the preamble of claim 1 such that said wiper blade can be mounted on the already-known wiper arm in a direction running perpendicular to the wiper blade longitudinal axis, without it being necessary for a different wiper arm to be used for this purpose. In particular, it should be made possible for an operator, depending on customer requirements, to use either the already-known wiper blade, which can be mounted on the wiper arm in the direction of the wiper blade longitudinal axis, or the wiper blade according to the invention, which can be mounted and dismantled transversely with respect to the wiper blade longitudinal axis.

Said object is achieved, in the case of a wiper blade for cleaning vehicle windows, by means of the features of claim 1. Advantageous refinements of the wiper blade according to the invention are specified in the subclaims. The invention encompasses all combinations of at least two of the features disclosed in the claims, the description and/or the figures.

A particularly secure connection between the wiper blade and the wiper arm is made possible if the wiper blade adapter has two detent tongues, which are arranged on opposite sides of the wiper blade adapter, and if the detent tongues with their mounting regions in unstressed state have a distance from each other which is greater than the internal width of the base section of the wiper arm adapter at the height of the mounting regions. As a result of said design, it is for example made possible that, even in the event of failure of one detent tongue, the other detent tongue continues to securely lock the wiper blade to the wiper arm. Furthermore, as a result of the distance between the two detent tongues, a prestress of the detent tongue in the direction of the holding section is generated which permits centering of the wiper blade adapter transversely with respect to the wiper arm adapter.

To securely position the wiper blade relative to the wiper blade in the mounting and dismantling direction, it is furthermore provided in a further embodiment that the mounting region has a contour which is adapted in a form-fitting manner to the cross section of the holding section.

To make the mounting of the wiper blade on the wiper arm particularly simple and convenient for the operator, it is furthermore provided, in a further structural embodiment of the invention, that the detent tongue is articulated on the wiper blade adapter on the upper side facing the wiper arm adapter, and that the detent tongue has on the side facing the upper side a ramp section which on relative moving to the holding section of the wiper arm adapter produces a movement of the detent tongue transversely to the mounting or respectively dismantling direction. This means that, during the mounting of the wiper blade on the wiper arm adapter, the detent tongue automatically passes into the region of the receiving contour, without it being necessary for the operator to perform additional handling movements for this purpose.

The operation, in particular the dismantling of the wiper blade from the wiper blade adapter, is furthermore made easier for the operator if the detent tongue has an actuating region which adjoins the mounting region on the side facing away from the base section of the wiper arm adapter, and if the actuating region with a mounted wiper arm adapter is arranged beneath the holding section of the wiper blade adapter.

Dismantling can be made particularly easy for the operator if the actuating region projects laterally over the contour of the wiper arm adapter. In this way, the operator can very easily haptically identify the actuating region.

An embodiment is furthermore very particularly preferable in which the wiper blade adapter has at least one stop contour which, when the wiper blade adapter is mounted, prevents a movement of the wiper blade in the wiper blade longitudinal axis. Such a stop contour may be produced in particular by a corresponding geometric form of the wiper blade adapter which is matched in a form-fitting manner to the geometry of the wiper arm adapter in the region of the wiper blade mount.

To prevent damage to the wiper blade adapter during the dismantling of the wiper blade from the wiper arm, for example as a result of overbending of the actuating regions of the detent tongues, it is furthermore advantageously provided that, for delimiting the movement of the actuating region, the wiper blade adapter forms a path stop for the actuating region.

Further advantages, features and details of the invention will emerge from the following description of preferred exemplary embodiments and on the basis of the drawing, in which:

FIG. 1 shows a wiper device, composed of a wiper blade according to the invention and a part of a wiper arm on which the wiper blade is mounted, in a perspective view, FIG. 2 shows a part of the wiper device in an enlarged perspective view, FIG. 3 shows the individual parts of the wiper device as per FIG. 2 in an exploded illustration, FIG. 4 shows a side view of the parts of the wiper device as per FIG. 2,

FIG. 5 and

FIG. 6 show cross sections in the region of the planes V-V and VI-VI from FIG. 4, and FIG. 7 shows a section in the plane VI-VI of FIG. 4 during the dismantling of the wiper blade from the wiper blade adapter.

Identical components or components of identical function are provided with the same reference numerals in the figures.

FIG. 1 shows a wiper blade 10 according to the invention for cleaning vehicle windows as part of a wiper device 100. The wiper blade 10 is fastened in an exchangeable manner by means of a wiper blade adapter 11 to a wiper arm adapter 12, which in turn is a constituent part of a wiper arm 1 (not illustrated in any more detail) or is connected to the wiper arm 1. The wiper arm 1 is moved in an oscillating manner by means of a window wiper drive (not illustrated).

The wiper blade 10 has an elongate wiper blade body 15 which, on the side facing toward the vehicle window, has a wiper rubber 16 with a wiper lip 17 arranged in operative connection with the vehicle window. The wiper blade body 15 extends at least substantially rectilinearly along a wiper blade longitudinal axis 20 when the wiper blade body 15 bears against a flat underlying surface or a flat vehicle window. In the completely unloaded state of the wiper blade body 15 (not illustrated), the latter has a slightly curved or arcuate form.

The exact structural design of the wiper blade body 15 is not of major significance within the context of this invention. In particular, the wiper blade body 15 may be formed as a so-called "aqua blade", that is to say as a wiper blade 10 with nozzle openings integrated therein for dispensing a washing liquid onto the vehicle window, optionally with an additional heating device.

It is essential merely that the wiper blade body 15 that is connected to the wiper blade adapter 11 is detachably connected to the wiper arm adapter 12 by means of a detent connection 22 explained in more detail further below, and that the mounting and dismantling of the wiper blade 10 on and from the wiper arm 1 takes place in the direction of the double arrow 23, wherein the direction of the double arrow 23 is at least substantially perpendicular to the wiper blade longitudinal axis 20.

As can be seen in particular from FIGS. 2 and 3, the wiper arm 1 has a substantially U-shaped cross section in a connection or mounting region 5 for the wiper blade 10. Here, the mounting region 5 of the wiper arm 1, which is preferably composed of sheet metal, comprises a base section 24 from which in each case one leg 25, 26 originates perpendicularly on mutually opposite sides. The leg 25, 26 is adjoined, on the side facing away from the base section 24, by a strip-shaped holding section 27, 28 formed preferably by virtue of a leg section being bent inward. In FIGS. 2 and 3 it is also possible to see, in the region of the base section 24, an aperture 29 which is rectangular in the exemplary embodiment and which may be provided if a wiper blade corresponding to EP 1 403 156 B1 is mounted on the wiper arm 1. Here, the aperture 29 serves to receive, in a form-fitting manner, a spring or detent tongue on the wiper blade or the wiper blade adapter of the wiper blade presented in the cited document.

The wiper blade adapter 11 is composed of a wiper-arm-side adapter element 32 and a wiper-blade-side adapter element 33, said adapter elements in particular both being composed of plastic and being formed as plastic injection molded parts. The wiper-blade-side adapter element 33 has, on the side facing toward the wiper blade body 15, a mount 34 for mounting the wiper blade body 15. Furthermore, in the wiper-blade-side adapter element 33, there is formed a through bore 35 into which guide pegs 36, 37 of the wiper-arm-side adapter element 32 project from opposite sides, as can be seen in particular from FIG. 5.

The guide pegs 36 and 37 and the through bore 35 serve for the pivotable mounting of the two adapter elements 32, 33 in a pivot axis 38 (FIG. 5).

The wiper-arm-side adapter element 32 of the wiper blade adapter 11 has, on opposite sides, in each case one detent tongue 41, 42 integrally formed on the wiper-arm-side adapter element 32 via in each case two webs 43, 44. Here, the webs 43, 44 are arranged, or rather the fastening of the detent tongues 41, 42 to the wiper-arm-side adapter element 32 is realized, in the region of the top side 45 of the wiper-arm-side adapter element 32 in the region of opposite longitudinal edges.

Furthermore, when FIGS. 3 and 6 are viewed together, it can be seen that the detent tongues 41, 42 have in each case one section 46 adjoined, on the side facing away from the webs 43, 44, by a ramp section 47 which, as per FIG. 6, has an approximately triangular cross section. The ramp section 47 is adjoined in turn by a mounting region 48, the form or geometry of which is matched to that of the holding sections 27, 28 of the wiper arm 1 in the region of the mounting region 5. Here, the mounting regions 48 of the two detent tongues 41, 42 form, together with the holding sections 27, 28 of the wiper arm 1, the detent connection 22.

To ensure the detent connection 22, it may be provided that the detent tongues 41, 42 with their mounting regions 48 in unstressed state have a distance from each other which is greater than the internal width of the base section 24 of the wiper arm adapter 12 at the height of the mounting regions 48.

The mounting region 48 is adjoined, on the side lying opposite the ramp section 47, by an actuating region 49, the actuating surface 50 of which is for example of serrated design in order to make actuation easier for an operator by increasing the friction between the actuating region 49 and the finger of the operator. As can be seen in particular from FIG. 2, when the wiper blade 10 and wiper blade adapter 11 are mounted, the actuating region 49 projects over the underside 51 of the wiper arm 1 and furthermore also projects laterally over the legs 25, 26 of the wiper arm 1.

The wiper arm 1 has, in the region of the legs 25, 26, a geometry with a front and a rear side edge 52, 53 and with a lower edge 54 in the region of the holding sections 27, 28. To secure or position the wiper blade 10 and the wiper blade adapter 11 to the wiper arm 1 in particular in the direction of the wiper blade longitudinal axis 20 when the wiper blade 10 is mounted, the side edges 52, 53 and the lower edge 54 of the wiper arm 1 interact with a counterpart contour 55 which acts as a stop and which is formed as a border on the wiper-arm-side adapter element 32.

The wiper blade 10 is mounted on the wiper arm 1 by virtue of the wiper blade 10 being moved with its wiper blade adapter 11 in one direction of the double arrow 23 onto the wiper arm 1. Here, firstly the side edges 52, 53 pass into operative connection with the counterpart contour 55 on the wiper-arm-side adapter element 32, such that the wiper blade adapter 11 is guided or centered with respect to the wiper arm 1. At the same time, the holding sections 27, 28 of the wiper arm 1 pass into operative connection with the planar sections 46 of the detent tongues 41, 42. During the further joining-together process, the holding sections 27, 28 pass into the region of the ramp sections 47 of the detent tongues 41, 42, as a result of which the detent tongues 41, 42 are pressed into the wiper-arm-side adapter element 32. Finally, the holding sections 27, 28 pass into the region of the mounting regions 48 of the detent tongues 41, 42, such that a form-fitting connection is formed between the mounting regions 48 and the holding sections 27, 28. At the same time, the lower edge 54 of the wiper arm 1 is also operatively connected to or at a minimum distance from the corresponding counterpart contour 55 of the wiper blade adapter 11.

To dismantle the wiper blade 10 from the wiper arm 1, the user presses the two detent tongues 41, 42 into the wiper-arm-side adapter element 32 as per the arrows 56 in FIG. 7 until the holding sections 27, 28 are situated outside the mounting regions 48. This may be signaled to the user in that the actuating regions 49 come into abutting contact, as per FIG. 7, with the wiper-arm-side adapter element 33, such that said actuating regions can be pressed in no further.

In addition, it is pointed out that it may possibly be expedient or provided for additional springs to be arranged on the wiper arm 1 or on the wiper blade 10, which springs facilitate or permit an active release of the wiper blade 10 from the wiper arm 1 when the holding sections 27, 28 are no longer in operative connection with the mounting regions 48 of the detent tongues 41, 42.

The wiper blade 10 thus described according to the invention and the wiper arm 1 may be changed or modified in numerous ways without departing from the concept of the invention. It is for example conceivable for the wiper arm 1 to have the aperture 29 not in the region of the base section 24 but rather in the region of the two legs 25, 26. Furthermore, the design of the wiper blade adapter 11, in particular of the two adapter elements 32, 33, may differ from the illustration or the design of the adapter elements 32, 33 disclosed in the description.

The invention claimed is:

1. A wiper blade for cleaning vehicle windows, comprising:
   a wiper blade body extending in a wiper blade longitudinal axis, the wiper blade body comprising at least one wiper blade adapter,
   wherein the wiper blade adapter makes possible a mechanical connection, constructed as detent connection, of the wiper blade with a wiper arm adapter arranged on a wiper arm,
   wherein the wiper blade adapter comprises at least one elastically arranged detent tongue, which cooperates in a form-fitting manner with the wiper arm adapter to form the detent connection,
   wherein the wiper arm is substantially U-shaped in cross section in the connection region of the wiper blade adapter and comprises a base section, having legs, on opposite sides, which embrace the wiper blade adapter laterally,
   wherein the legs have inwardly bent, strip-shaped holding sections on a side lying opposite the base section,
   wherein the connecting or releasing between the wiper blade adapter and the wiper arm adapter takes place substantially in a direction which runs perpendicular to the wiper blade longitudinal axis, and the at least one detent tongue has a mounting region, which embraces the holding section of the wiper arm adapter for formation of the detent connection,
   wherein the mounting region has a contour which is adapted in a form-fitting manner to the cross section of the holding section,
   wherein the detent tongue is articulated on the wiper blade adapter on an upper side facing the wiper arm adapter, and wherein the detent tongue comprises, on the side facing the upper side, a ramp section which on relative moving to the holding section of the wiper arm adapter, produces a movement of the detent tongue transversely to the mounting or dismantling direction, and
   wherein the detent tongue has an actuating region which adjoins the mounting region on the side facing away from the base section of the wiper arm adapter, and wherein the actuating region with a mounted wiper arm adapter is arranged beneath the holding section of the wiper arm adapter.

2. The wiper blade according to claim 1, the wiper blade adapter has two detent tongues, which are arranged on opposite sides of the wiper blade adapter, and wherein the two detent tongues and corresponding mounting regions in an unstressed state have a distance from each other which is greater than an internal width of the base section of the wiper arm adapter at a height of the mounting regions.

3. The wiper blade according to claim 1, wherein the detent tongue is formed in one piece on the wiper blade adapter and is connected therewith via two connecting webs.

4. The wiper blade according to claim 1, wherein the actuating region projects laterally over the contour of the wiper arm adapter.

5. The wiper blade according to claim 1, wherein the wiper blade adapter has a stop contour, which with a geometry constructed on the wiper arm adapter prevents a movement of the wiper blade in the wiper blade longitudinal axis.

6. The wiper blade according claim 1, wherein the wiper blade adapter, for delimiting the movement of the actuating section on dismantling of the wiper blade adapter from the wiper arm adapter, forms a path stop for the actuating section.

7. A wiper device, comprising:
   a wiper arm, wherein the wiper arm is substantially U-shaped in cross section in a connecting region with a wiper blade adapter, the wiper arm comprising:
      a base section from which, on opposite sides, legs originate, which have an inwardly bent, strip-shaped holding section on the side lying opposite the base section; and
   a wiper blade a comprising:
      wiper blade body extending in a wiper blade longitudinal axis, the wiper blade body comprising the wiper blade adapter,
      wherein the wiper blade adapter makes possible a mechanical connection, constructed as detent connection, of the wiper blade with a wiper arm adapter arranged on a wiper arm,
      wherein the wiper blade adapter comprises at least one elastically arranged detent tongue, which cooperates in a form-fitting manner with the wiper arm adapter to form the detent connection,
      wherein the legs of the wiper arm embrace the wiper blade adapter laterally,
   wherein the connecting or releasing between the wiper blade adapter and the wiper arm adapter takes place substantially in a direction which runs perpendicular to the wiper blade longitudinal axis, and the at least one detent tongue has a mounting region, which embraces the holding section of the wiper arm adapter for formation of the detent connection,
   wherein the mounting region has a contour which is adapted in a form-fitting manner to the cross section of the holding section,
   wherein the detent tongue is articulated on the wiper blade adapter on an upper side facing the wiper arm adapter, and wherein the detent tongue comprises, on the side facing the upper side, a ramp section which on relative moving to the holding section of the wiper arm adapter, produces a movement of the detent tongue transversely to the mounting or dismantling direction, and
   wherein the detent tongue has an actuating region which adjoins the mounting region on the side facing away from the base section of the wiper arm adapter, and wherein the actuating region with a mounted wiper arm adapter is arranged beneath the holding section of the wiper arm adapter.

* * * * *